US010285072B1

(12) United States Patent
Chukka et al.

(10) Patent No.: US 10,285,072 B1
(45) Date of Patent: May 7, 2019

(54) MITIGATION OF SIGNAL CONFLICT IN WIRELESS COMMUNICATION NETWORKS

(71) Applicant: Sprint Communications Company L.P., Overland Park, KS (US)

(72) Inventors: Chaitanya Chukka, Schaumburg, IL (US); Matthew J. Masters, Greenfield, IN (US); Patrick Jacob Schmidt, Basehor, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/013,723

(22) Filed: Jun. 20, 2018

Related U.S. Application Data (63) Continuation of application No. 15/254,737, filed on Sep. 1, 2016, now Pat. No. 10,034,182.

(51) Int. Cl.
*H04W 16/28* (2009.01)
*H04W 56/00* (2009.01)
*H04W 24/08* (2009.01)
*H04L 5/00* (2006.01)

(52) U.S. Cl.
CPC .......... *H04W 16/28* (2013.01); *H04W 24/08* (2013.01); *H04W 56/0005* (2013.01); *H04W 56/006* (2013.01); *H04W 56/0065* (2013.01); *H04L 5/0048* (2013.01)

(58) Field of Classification Search
CPC .............................. H04W 16/28; H04W 24/08

USPC ...................................... 455/418, 435.1, 434
See application file for complete search history.

(56) References Cited

U.S. PATENT DOCUMENTS

| | | | |
|---|---|---|---|
| 8,254,843 B2 | 8/2012 | Tillotson | |
| 8,417,207 B2 | 4/2013 | Mesecher | |
| 8,576,769 B2 | 11/2013 | Zheng | |
| 9,287,941 B2 | 3/2016 | Pajona et al. | |
| 2011/0116569 A1* | 5/2011 | Vaughan | H04B 1/0483 375/295 |
| 2013/0182630 A1* | 7/2013 | Yamamoto | H04J 11/0073 370/312 |
| 2015/0092566 A1* | 4/2015 | Balachandran | H04W 8/22 370/242 |
| 2016/0226612 A1* | 8/2016 | Axmon | H04J 11/005 |
| 2017/0272966 A1 | 9/2017 | Scahill et al. | |

FOREIGN PATENT DOCUMENTS

| | | |
|---|---|---|
| CA | 2769828 A1 | 3/2011 |
| WO | 2013134128 A1 | 9/2013 |
| WO | 2015187130 A1 | 12/2015 |

\* cited by examiner

*Primary Examiner* — Chuck Huynh (57) ABSTRACT

Detection and mitigation of signal conflict, such as a primary synchronization signal conflict, between broadcast cells in a wireless communication network is provided. Multiple broadcast cells may be provided in the network to provide sectors of coverage. A mobile communication device may operate within the network and attempt to attach to one or more of the broadcast cells. A synchronization signal conflict between neighboring broadcast cells may be identified and mitigated using one or more adjustments to the broadcast cells or signals emitted therefrom, which may allow for improved network performance, among other benefits.

20 Claims, 10 Drawing Sheets

MITIGATION OF SIGNAL CONFLICT IN WIRELESS COMMUNICATION NETWORKS

CROSS-REFERENCE TO RELATED APPLICATIONS AND CLAIM OF PRIORITY

This Non-Provisional Patent Application is a continuation of co-pending U.S. patent application Ser. No. 15/254,737, filed Sep. 1, 2016, titled "Mitigation of Signal Conflict in Wireless Communication Networks," which is herein incorporated by reference in the entirety.

TECHNICAL FIELD

The present technology relates to signal conflict in wireless communication networks.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

In brief, and at a high level, this disclosure describes, among other things, identification and mitigation of signal conflict in wireless communication networks. More specifically, the present disclosure provides for identification of a synchronization signal conflict between broadcast cells operating within a wireless communication network, and mitigation of the synchronization signal conflict by modifying one or more of the broadcast cells or the signals emitted therefrom. As a result of the identification and mitigation of signal conflict, improvements in network connection, signal interference, and/or attachment lag time for mobile communication devices in the network may be achieved, among other benefits.

In one embodiment, a method for mitigating signal conflict in a wireless communication network is provided. The method comprises providing a first broadcast cell that operates within the wireless communication network, the first broadcast cell emitting a first signal comprising at least one synchronization signal of a physical layer identity group, and providing a second broadcast cell that operates within the wireless communication network, the second broadcast cell emitting a second signal comprising the at least one synchronization signal of the physical layer identity group. The method further comprises attempting to attach a mobile communication device located within the wireless communication network to at least one of the first broadcast cell and the second broadcast cell using the at least one synchronization signal, identifying a synchronization signal conflict between the first broadcast cell and the second broadcast cell, and mitigating the synchronization signal conflict.

In another embodiment, one or more non-transitory computer-readable media having computer-executable instructions embodied thereon are provided that, when executed, perform a method of mitigating signal conflict in a wireless communication network. The method comprises determining that a synchronization signal conflict exists between a first broadcast cell and a second broadcast cell operating within the wireless communication network, the first broadcast cell emitting a first signal from a first transmitting and receiving component that is in communication with a mobile communication device, and the second broadcast cell emitting a second signal from a second transmitting and receiving component that is in communication with the mobile communication device. The method further comprises mitigating the synchronization signal conflict by sending an instruction to modify at least one of a signal and an orientation thereof of at least one of the first broadcast cell and the second broadcast cell.

In another embodiment, a system for mitigating signal conflict in a wireless communication network is provided. The system comprises a first broadcast cell that operates within the wireless communication network, the first broadcast cell configured to emit a first signal using a first transmitting and receiving component, the first signal comprising at least one synchronization signal of a physical layer identity group, and a second broadcast cell that operates within the wireless communication network, the second broadcast cell configured to emit a second signal using a second transmitting and receiving component, the second signal comprising the at least one synchronization signal of the physical layer identity group. The system further comprises one or more processors configured to determine that a synchronization signal conflict exists between the first broadcast cell and the second broadcast cell, and mitigate the synchronization signal conflict by sending an instruction to modify at least one of an orientation of the first and second transmitting and receiving components relative to each other to modify an orientation of the first and second signals relative to each other, and at least one of the first and second signals.

The term "transmitting and receiving component" as used herein may include any antenna, antenna system, or other component configured to broadcast and/or receive a wireless communications signal over a network to communicate with a mobile communication device. The term "broadcast cell" as used herein may include any base station, access point, or access node in a network to which a mobile communication device may attach to connect to a wireless communication network.

BRIEF DESCRIPTION OF THE DRAWINGS

The present technology is described in detail herein with reference to the attached figures, which are intended to be exemplary and non-limiting in nature, wherein.

DETAILED DESCRIPTION

The subject matter of the present technology is described in this disclosure to meet statutory requirements. However, the description is not intended to limit the scope of the invention. Rather, the claimed subject matter may be embodied in other ways, to include different steps, combinations of steps, features, or combinations of features, similar to the ones described in this disclosure, and in conjunction with other present or future technologies. Moreover, although the terms "step" and/or "block" may be used to identify different elements of methods employed, the terms should not be interpreted as implying any particular order among or between various steps or blocks unless and except when the order of individual steps or blocks is explicitly described and required.

At a high level, the present technology relates generally to wireless communication networks and identification and mitigation of signal conflict within the same. A wireless communication network may include one or more broadcast cells, one or more mobile communication devices, and one or more processors, servers, and/or other centralized and/or decentralized computing and processing systems for controlling and monitoring the network. Signal conflict between broadcast cells may be identified by such systems, and may be mitigated through modification of hardware, software, and/or a wireless communication signal transmitted over the network from various network components, as described in greater detail below and with respect to the exemplary embodiments shown in FIGS. 1-11.

Broadcast cells in wireless communication networks transmit and receive signals to establish areas of coverage. Common signal characteristics (e.g., channels, frequencies, frequency bands, encoding, etc.) are sometimes used by neighboring broadcast cells within wireless communication networks to provide uniform interaction with mobile communication devices operating within the networks. In some networks, such as those utilizing Long Term Evolution ("LTE"), a Physical Layer Cell Identity ("PCI") may be used to identify broadcast cells and control channel synchronization within the network. PCIs are arranged in unique Cell Layer Identity Groups ("CLIG"), which include three Physical Layer Identities ("PLI") that are used to identify different broadcast cells within the network. To carry the PLI and PCI, at least two signals may be provided by each broadcast cell, a primary synchronization signal ("PSS") and a secondary synchronization signal ("SSS"). The PSS specifies one of three values (0, 1, 2) that identifies the broadcast cell's physical layer identity, and the SSS specifies the broadcast cell's CLIG, which may be one of a number of values. Both the PSS and the SSS may be decoded and used by a mobile communication device to identify and attach to a broadcast cell. More specifically, successfully recognizing and decoding a PSS and SSS from a broadcast cell may allow a mobile communication device to obtain timing and identity for the broadcast cell, allowing proper attachment of the mobile communication device to the broadcast cell for uplink/downlink and network communication.

Broadcast cells are often arranged and configured to avoid PCI conflict, particularly during initial setup. However, even with distinct PCIs, broadcast cells may still have a common PSS and/or SSS, may be transmitting/receiving over a common channel, and/or also may have a direct line of sight with neighboring broadcast cells, such that there is an overlap of coverage area. As a result, a synchronization signal conflict may occur between neighboring broadcast cells based on a common PSS and/or a common SSS. This conflict may confuse a mobile communication device that is attempting to attach to the network through at least one of the interfering neighboring broadcast cells. As a result, this interference may cause network performance to be affected, such as through extended attachment times to the network, and/or through an increase in failed attachments to the network, among other performance indicators.

Identification of Synchronization Signal Conflict

In embodiments of the present technology, managing signal conflicts, such as PSS and SSS conflicts, in a wireless communication network requires identification and/or detection of a signal conflict, so that mitigation of the signal conflict may occur at the broadcast cells either through local or remote (e.g., broadcast cell or central server) action and/or direction. For example, in a circumstance where a PSS or SSS conflict between neighboring broadcast cells has occurred, the PSS and/or SSS conflict may be identified through different network characteristics, such as attachment time for mobile devices, attachment success for mobile devices, network performance, and also location, lines of sight, and coverage areas of neighboring broadcast cells, among other factors. These characteristics may be used to determine a signal conflict. As one example, when an attachment time for a mobile communication device within an area where neighboring broadcast cells are located exceeds a predetermined threshold, it may be determined that a signal conflict has occurred, and an indication or notification may be sent to at least one of the neighboring broadcast cells to take action to mitigate the signal conflict. Alternatively, monitoring of failed attachment attempts of mobile communication devices within the network where neighboring broadcast cells are located may also trigger an indication of a signal conflict. Still further, user-equipment and/or network equipment (EnodeBs, central servers, network monitoring components, etc.) remote from the broadcast cells may be configured to detect signal conflict based on the above-noted factors, and/or other factors.

A PSS/SSS signal conflict may occur between neighboring broadcast cells when a direct line of sight exists between neighboring broadcast cells, the neighboring broadcast cells have overlapping sectors of coverage, a common channel (i.e., frequency or frequency band) is used by the neighboring broadcast cells, and a same PSS and/or SSS is used by the neighboring broadcast cells. Regarding the direct line of sight, signal alignment may occur between one or more transmitting and receiving components of respective neighboring broadcast cells, resulting in direct signal interference that contributes to a signal conflict. For example, a first antenna of a first broadcast cell may be aligned along a similar line as a second antenna of a second broadcast cell (e.g., 0° variance from a direct line of sight between the first and second antennas). A distance, position, angle, and/or coverage area between neighboring broadcast cells may also be considered in determining signal conflict.

Mitigation of Synchronization Signal Conflict

Once a synchronization signal conflict between two or more broadcast cells has been detected, either through activity and indication from a mobile communication device, signal analysis between broadcast cells, communication with a central processor that monitors the wireless communication network, and/or any other methods, mitigation of synchronization signal conflict may initiate. In one aspect, mitigation may comprise a physical adjustment of components of one or more neighboring broadcast cells that have been determined to have a signal conflict, to adjust an orientation of signals relative to each other. In another aspect, mitigation may include adjustment of an actual signal transmitting from one or more of the neighboring broadcast cells, to reduce interference of the signals. These adjustments may be done alternatively or together, depending on the desired or available functionality of components and/or systems within the wireless communication network.

For mitigation by a physical modification, the orientation and/or alignment of signal transmitting and receiving components of a broadcast cell may be adjusted to reduce alignment of a signal with neighboring broadcast cell signals, reducing signal interference. For example, a broadcast cell may comprise an array of signal transmitting and receiving components that each transmit and receive signals over respective sectors of coverage. The broadcast cell may be designed such that its signal transmitting and receiving components may be adjusted individually or in unison, allowing the orientation of signals emitted from the broadcast cell to be changed. Each broadcast cell may include one or more movement mechanisms that are coupled to respective transmitting and receiving components of the broadcast cells that provide sectors of coverage. These movement mechanisms may be controlled, locally or remotely, to adjust an azimuth and elevation of a signal emitted from a respective transmitting and receiving component. The movement mechanisms may comprise one or more electric or mechanical-based actuators or motors configured to move the associated signal transmitting and receiving components in an x-y axis or y-z axis relative to the broadcast cell, to allow an adjustment of the signal relative to other signals transmitted from other neighboring base stations, allowing control of signal interference. The movement mechanisms may be controlled locally by a broadcast cell, such as through one or more processors of an EnodeB, or remotely, such as through one or more computers, processors, and/or systems of a central server that monitor and control network performance and send instruction signals to the broadcast cells.

Regarding a mitigation by signal modification, when a signal conflict is identified, one or more characteristics of a signal emitted from one or more neighboring broadcast cells may be adjusted to reduce signal interference. For example, upon identifying a signal conflict, a broadcast cell may independently, or upon instruction from a central server, adjust the signal emitted from one or more associated transmitting and receiving components. The modification may be of a frequency, a frequency band, a channel, and/or a power of the signal to adjust a coverage area thereof. The signal adjustment may occur upon instruction, or automatically at the broadcast cell upon identification of a synchronization signal conflict. Additional methods of reducing signal interference, including PSS and SSS conflict, between broadcast cells in a wireless communication network are possible and contemplated herein.

Embodiments of the technology may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Figure 1:
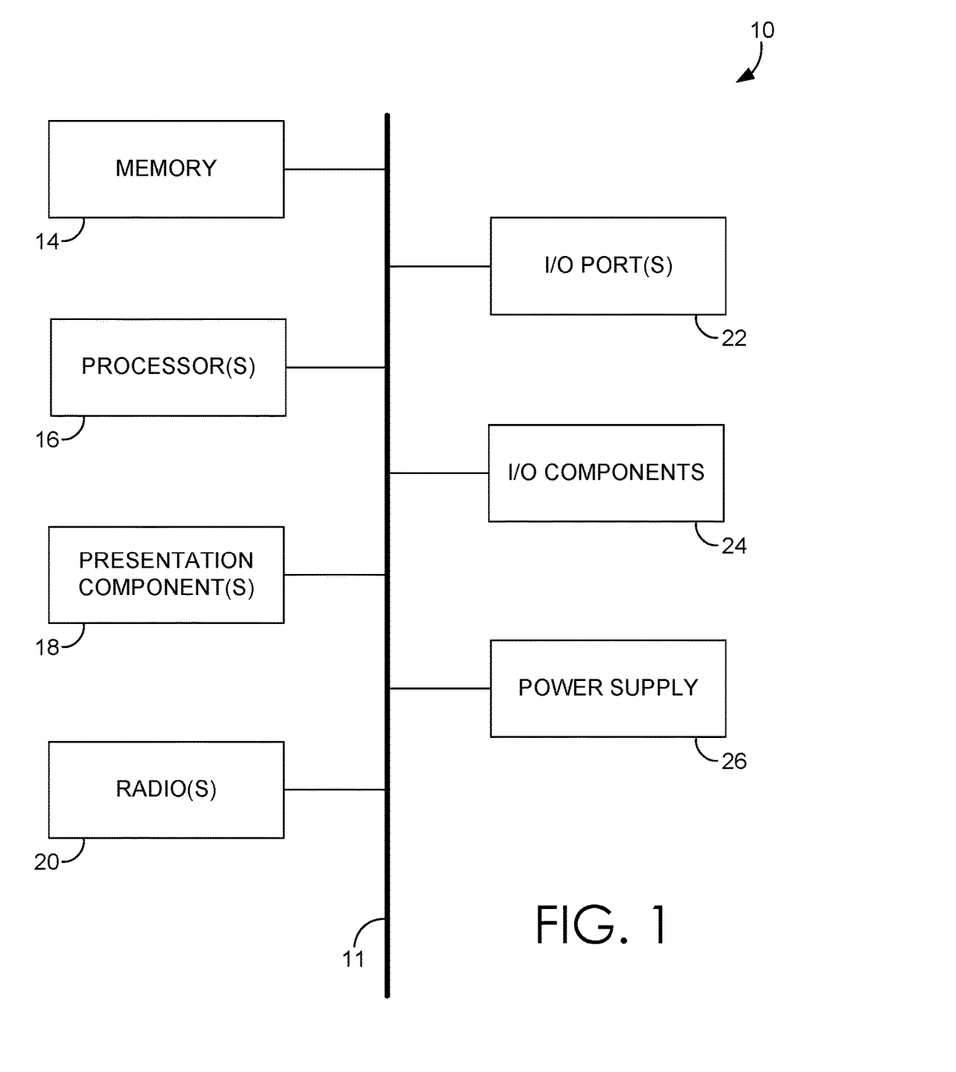
FIG. 1 is an exemplary computing device for mitigation of signal conflict, in accordance with an embodiment of the present technology.

Referring to FIG. 1, a block diagram of an exemplary computing device 10 for use in signal mitigation in wireless communication networks is provided, in accordance with an embodiment of the present technology. It should be noted that although some components in FIG. 1 are shown in the singular, they may be plural. For example, the computing device 10 might include multiple processors or multiple radios. As shown in FIG. 1, computing device 10 includes a bus 11 that directly or indirectly couples various components together, including memory 14, processor(s) 16, presentation component(s) 18 (if applicable), radio(s) 20, input/output (I/O) port(s) 22, input/output (I/O) component(s) 24, and power supply 26.

Memory 14 may take the form of memory components described herein. Thus, further elaboration will not be provided here, but it should be noted that memory 14 may include any type of tangible medium that is capable of storing information, such as a database. A database may be any collection of records, data, and/or information. In one embodiment, memory 14 may include a set of embodied computer-executable instructions that, when executed, facilitate various functions or elements disclosed herein. These embodied instructions will variously be referred to as "instructions" or an "application" for short. Processor 16 may actually be multiple processors that receive instructions and process them accordingly. Presentation component 18 may include a display, a speaker, and/or other components that may present information (e.g., a display, a screen, a lamp (LED), a graphical user interface (GUI), and/or even lighted keyboards) through visual, auditory, and/or other tactile cues.

The radio 20 may facilitate communication with a network, and may additionally or alternatively facilitate other types of wireless communications, such as Wi-Fi, WiMAX, LTE, and/or other VoIP communications. In various embodiments, the radio 20 may be configured to support multiple technologies, and/or multiple radios may be configured and utilized to support multiple technologies.

The input/output (I/O) ports 22 may take a variety of forms. Exemplary I/O ports may include a USB jack, a stereo jack, an infrared port, a firewire port, other proprietary communications ports, and the like. Input/output (I/O) components 24 may comprise keyboards, microphones, speakers, touchscreens, and/or any other item usable to directly or indirectly input data into the computing device 10.

Power supply 26 may include batteries, fuel cells, and/or any other component that may act as a power source to supply power to the computing device 10 or to other network components, including through one or more electrical connections or couplings. Power supply 26 may be configured to selectively supply power to different components independently and/or concurrently.

Figure 2:
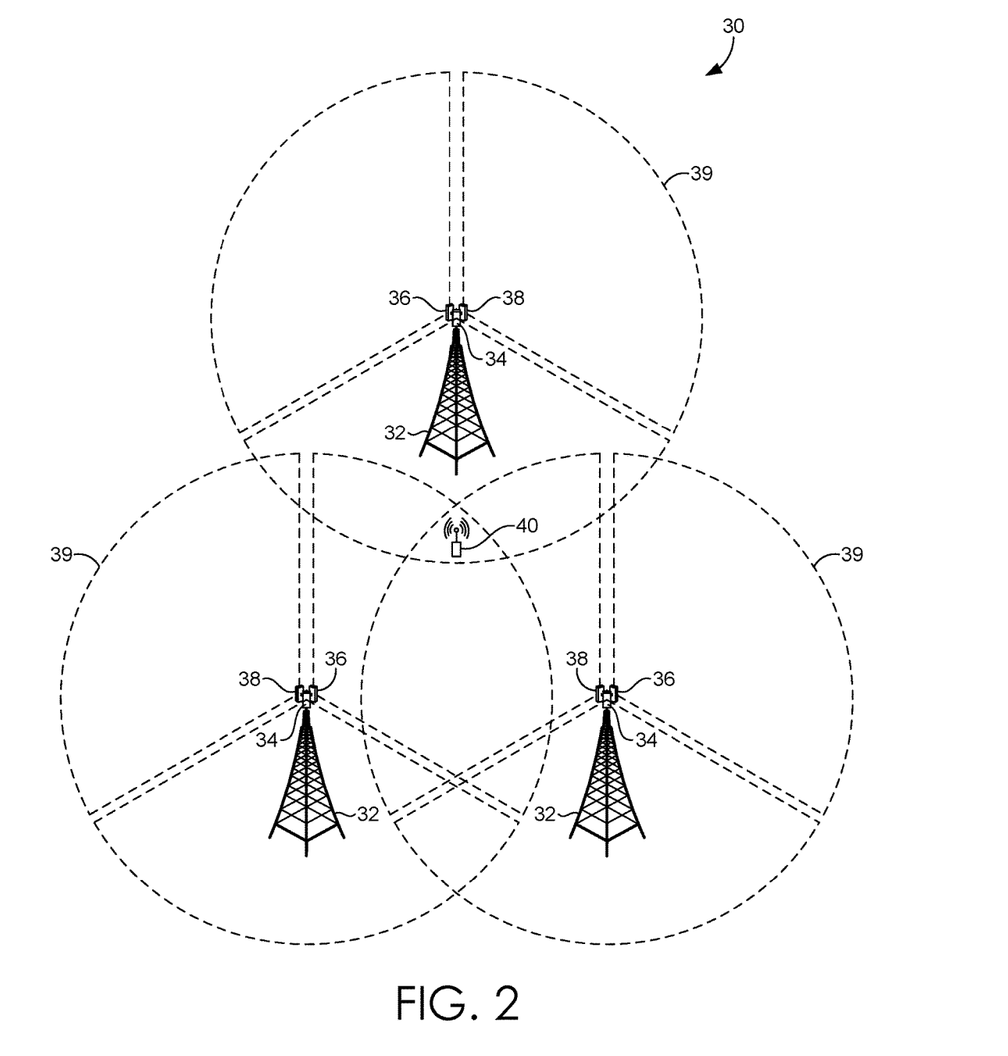
FIG. 2 is an exemplary wireless communication network with multiple broadcast cells, in accordance with an embodiment of the present technology.

Referring to FIG. 2, an exemplary wireless communication network 30 is provided, in accordance with an embodiment of the present technology. In FIG. 2, the network 30 includes a plurality of broadcast cells 32 that provide respective areas of coverage 39, some of which are overlapping. Each broadcast cell 32 is shown with multiple transmitting and receiving components 34, 36, 38 that serve respective sectors of coverage of the broadcast cell 32, and that are configured to communicate with a mobile communication device 40 operating within the network 30. The mobile communication device 40 may be configured to attach to one of the broadcast cells 32 through communication with a signal transmitted therefrom.

Figure 3:
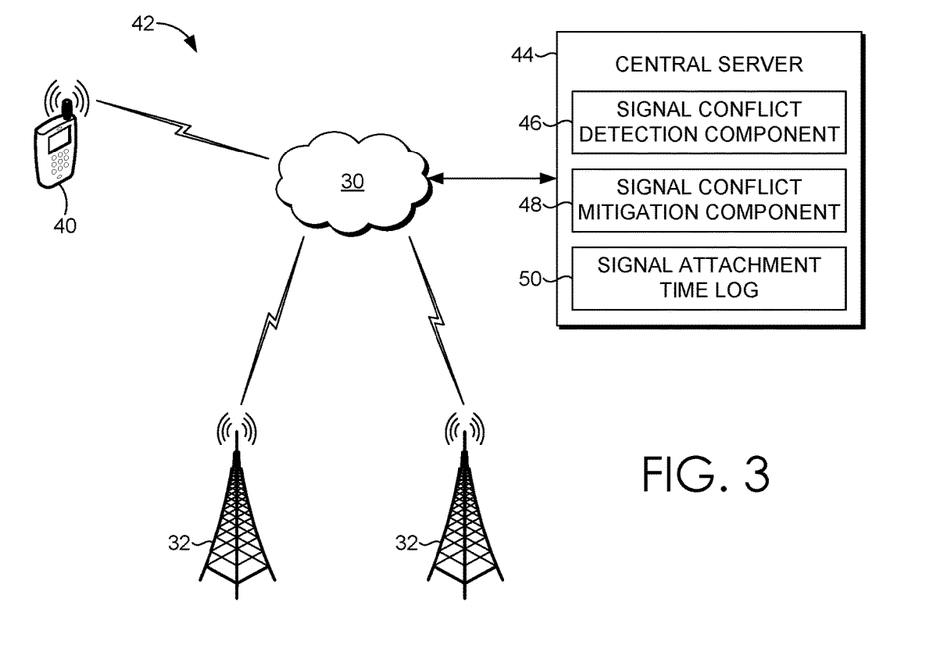
FIG. 3 is an exemplary system for signal conflict mitigation in a wireless communication network, in accordance with an embodiment of the present technology.

Referring to FIG. 3, an exemplary system 42 for signal mitigation in a wireless communication network is provided, in accordance with an embodiment of the present technology. In a wireless communication network, such as, for example, the network 30 shown in FIG. 2, a central server 44 may be used at least to identify and mitigate signal conflict within the network 30. The central server 44 may be in communication with the broadcast cells 32 and/or with mobile communication devices 40 operating within the network 30. The central server 44 may comprise a signal conflict detection component 46, which may be used to identify when signal conflict is occurring between broadcast cells 32 within the network 30, a signal conflict mitigation component 48, which may be used to provide instructions for signal mitigation to one or more of the broadcast cells 32 where signal conflict is occurring, and/or a signal attachment time log 50, which may be used to record, maintain, and update attachment times and/or attachment failures of mobile communication devices operating within the network 30. Additionally, more or fewer, or alternative components, may be used to identify and mitigate signal conflict. Multiple servers may be used as well.

Figure 4:
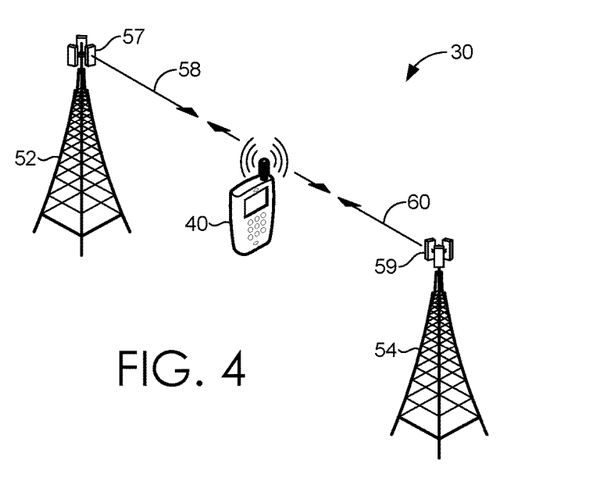
FIG. 4 is a mobile communication device attempting to attach to a wireless communication network, in accordance with an embodiment of the present technology.

Referring to FIG. 4, a mobile communication device 40 is shown within a portion of a wireless communication network 30 where signal conflict is occurring, in accordance with an embodiment of the present technology. In FIG. 4, the mobile communication device 40 is shown located between first and second broadcast cells 52, 54 operating within the network 30. The mobile communication device 40 is attempting to connect to the network 30 by attaching to one of the first and second broadcast cells 52, 54. Additionally, first and second transmitting and receiving components 57, 59 of the broadcast cells 52, 54 have a direct line of sight with each other, such that their respective first and second signals 58, 60 are in direct alignment without ground obstruction (e.g., trees, buildings, etc.). Additionally, the mobile communication device 40 is within the sectors of coverage provided by each of the respective signals 58, 60. As discussed in earlier sections, in circumstances in which a distance between the first and second transmitting and receiving components 57, 59 is such that the sectors of coverage of the first and second broadcast cells 52, 54 overlap, a common channel is used, and a common synchronization signal is used (e.g., PSS or SSS), the direct alignment of the first and second transmitting and receiving components 57, 59 may confuse or stall the attachment of the mobile communication device 40 to one of the first and second broadcast cells 52, 54 due to signal interference, even though a PLI of the respective broadcast cells 52, 54 is not in conflict. This lengthened attachment time may result in undesirably low attachment times or failed attachments, which may be improved by signal conflict detection and mitigation.

Figure 5:
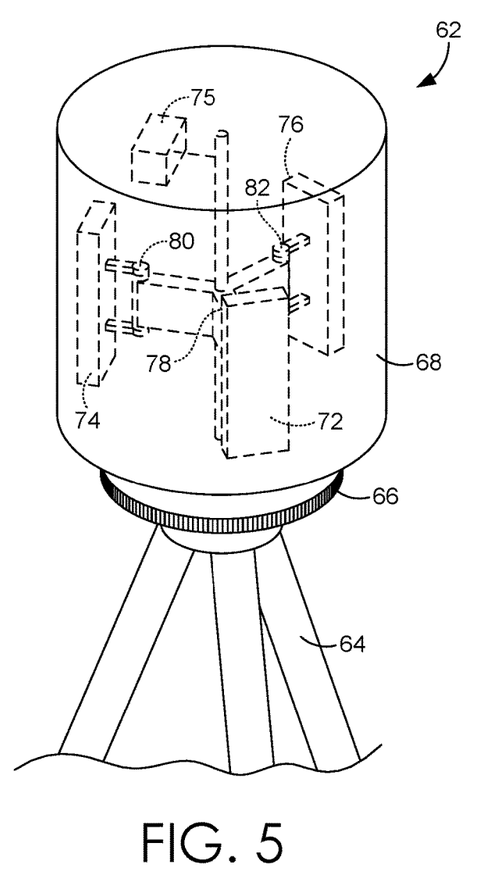
FIG. 5 is an exemplary configuration of a broadcast cell for mitigation of signal conflict, in accordance with an embodiment of the present technology.

Referring to FIG. 5, an exemplary broadcast cell 62 configured for mitigation of signal conflict is provided, in accordance with an embodiment of the present technology. FIG. 5 depicts only a selection of components for clarity and explanatory purposes, and more or few components, as well as alternative arrangements of components and/or functionality of components, are possible and contemplated as well. The broadcast cell 62 includes a base 64, a rotatable coupling 66, a housing 68 with a canister-type configuration, and a plurality of signal transmitting and receiving components 72, 74, 76 located within the housing that are movably coupled to the broadcast cell 62 with respective movement mechanisms 78, 80, 82. The movement mechanisms 78, 80, 82 allow for selective adjustment of the transmitting and receiving components 72, 74, 76 to, by relation, allow adjustment of an angle of the respective signals emitted therefrom. Additionally, the broadcast cell 62 includes a communication and control component 75 which may be used to communicate with a central server. The communication and control component 75 may be configured to control the movement mechanisms 78, 80, 82 based on instructions received from the central server, and may also be used to communicate signal information (orientation, channel, frequency, interference, etc.) of the signal transmitting and receiving components 72, 74, 76 to the central server for network monitoring and signal conflict mitigation purposes.

Depending on the configuration of the broadcast cell 62 and the components thereof, adjusting the orientation of the emitted signals may be performed in several ways. For example, the entire housing 68 of the broadcast cell 62 may be rotated using the rotational coupling 66 to adjust the azimuth of the signals emitted by the respective transmitting and receiving components 72, 74, 76 in unison. Alternatively or additionally, the transmitting and receiving components 72, 74, 76 of the broadcast cell 62 may be individually adjusted in different angular directions as needed to reduce signal interference, such as by using the movement mechanisms 78, 80, 82. The orientation and characteristics (frequency, channel, power, etc.) of the signals emitted from the transmitting and receiving components 72, 74, 76 may further be monitored and logged in a database locally, and/or may be communicated and stored in the central server. Additionally, other feedback and data from mobile communication devices in communication with the broadcast cell 62 may be monitored and logged locally or remotely as well.

When a signal conflict, such as a PSS or SSS conflict, between the broadcast cell 62 and a neighboring broadcast cell is detected, the signal conflict may be mitigated by adjusting an offending one (or more) of the transmitting and receiving components 72, 74, 76. The adjustment may be to the actual signal emitted from the offending one of the transmitting and receiving components 72, 74, 76, and/or by adjusting an orientation thereof to reduce interference through misaligning the signals of the broadcast cell 62 and the neighboring broadcast cell. This adjustment may be initiated and/or controlled locally by the broadcast cell 62, and/or may be directed through instruction received from the central server. As described in greater detail in FIGS. 6A-6C, the movement mechanisms 78, 80, 82 may actuate movement of the respective transmitting and receiving components 72, 74, 76 to provide movement in the x-axis to adjust an azimuth of the emitted signal, the y-axis to adjust an elevation of the emitted signal, and the z-axis to adjust a radiation center of the emitted signal.

The broadcast cell 62 may further be configured to allow for adjustment to the signals emitted from the signal transmitting and receiving components 72, 74, 76. For example, upon determining that a signal conflict, such as a PSS or SSS conflict, has occurred, a central server may send an instruction to the broadcast cell 62 to adjust a signal emitted from one of the transmitting and receiving components 72, 74, 76 that is causing a signal conflict with another broadcast cell. The signal may be modified locally through adjustment of a channel, frequency, power, or other encoding/characteristic of the signal. The central server, as discussed, may control and record the orientations, coverage areas, alignments, and signal characteristics of neighboring broadcast cells.

Figure 6A:
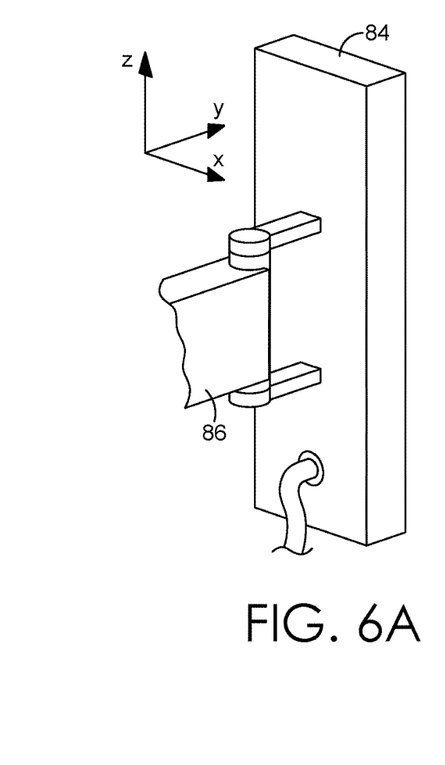
FIGS. 6A-6C depict various configurations of a signal transmitting and receiving component of a broadcast cell that can be adjusted for mitigation of signal conflict, in accordance with embodiments of the present technology.
Figure 6B:
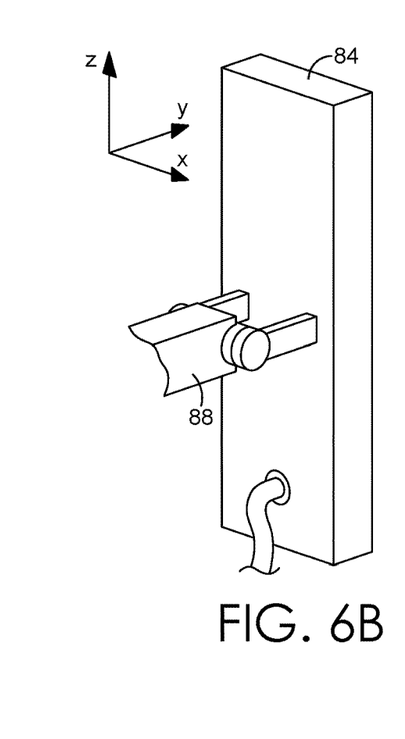
Figure 6C:
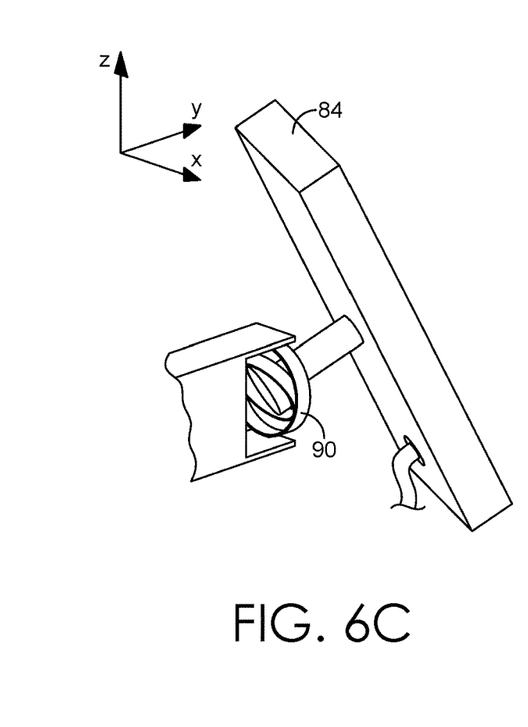

Referring to FIGS. 6A-6C, a signal transmitting and receiving component 84 for a broadcast cell, such as the broadcast cell 62 shown in FIG. 5, is depicted coupled to a variety of different movement mechanisms 86, 88, 90 for adjusting an orientation of the signal transmitting and receiving component 84 relative to a broadcast cell. In FIG. 6A, the signal transmitting and receiving component 84 is coupled to a first movement mechanism 86 that is configured to move the signal transmitting and receiving component in an x-y plane, to adjust an azimuth of the emitted signal. In FIG. 6B, the signal transmitting and receiving component 84 is coupled to a second movement mechanism 88 that is configured to move the signal transmitting and receiving component 84 in a y-z plane, to adjust an elevation of the emitted signal relative to the broadcast cell, potentially allowing control of a coverage area of the emitted signal. In FIG. 6C, the signal transmitting and receiving component 84 is coupled to a third movement mechanism 90 with a gimbal-type configuration that allows movement in both an x-y plane and a y-z plane. The adjustment of the signal transmitting and receiving component 84 through use of the first, second, and/or third movement mechanisms 86, 88, 90 may be utilized to control alignment of emitted signals between neighboring broadcast cells in a network.

Figure 7A:
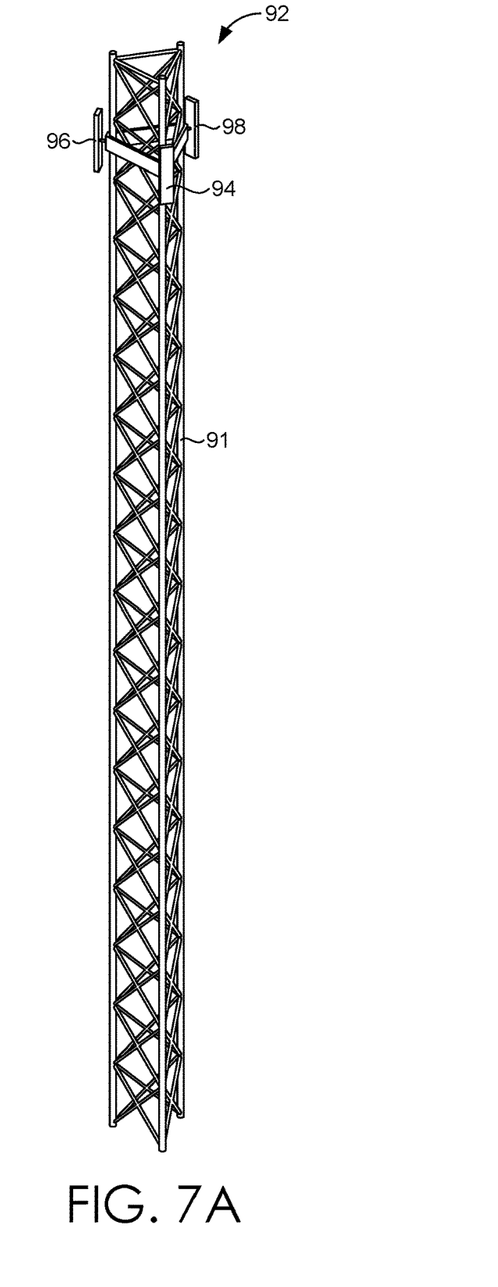
FIGS. 7A-7B depict modification of a radiation center of a broadcast cell, in accordance with an embodiment of the present technology.
Figure 7B:
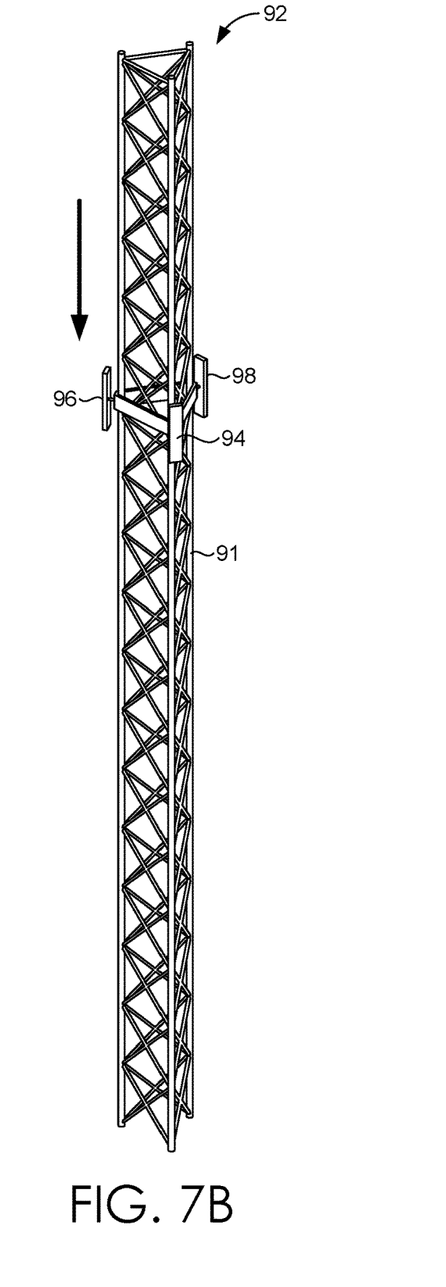

Referring to FIGS. 7A-7B, a modification of a radiation center of a broadcast cell for mitigation of signal conflict is provided, in accordance with an embodiment of the present technology. In FIG. 7A, a broadcast cell 92 is provided with an array of transmitting and receiving components 94, 96, 98 on a tower 91. The transmitting and receiving components 94, 96, 98 are positioned at a predetermined height, and transmit a signal over a wireless communication network from the tower 91. When a signal conflict is detected between the signal emitted by the broadcast cell 92 and another neighboring broadcast cell, the radiation center may be adjusted up or down, as shown in FIG. 7B, to modify an area of coverage provided by the broadcast cell 92 which, in turn, can reduce signal interference between the neighboring broadcast cells. The adjustment of the radiation center may be controlled locally or by a central server in communication with the broadcast cell 92. The adjustment may also be controlled by a movement mechanism, such as a gear-and-track movement mechanism or by a linear actuator mechanism coupled to the broadcast cell 92.

Figure 8A:
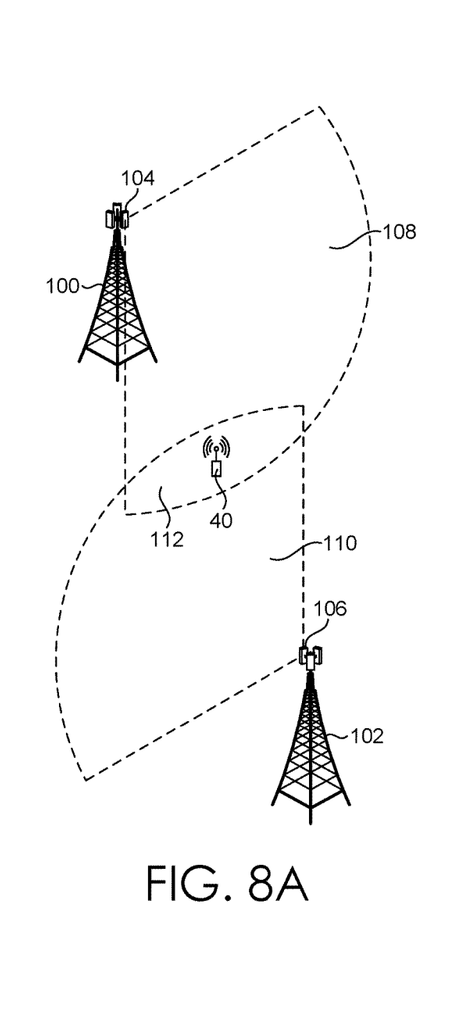
FIGS. 8A-8B depict an exemplary adjustment of a signal from a broadcast cell to mitigate signal conflict, in accordance with an embodiment of the present technology.
Figure 8B:
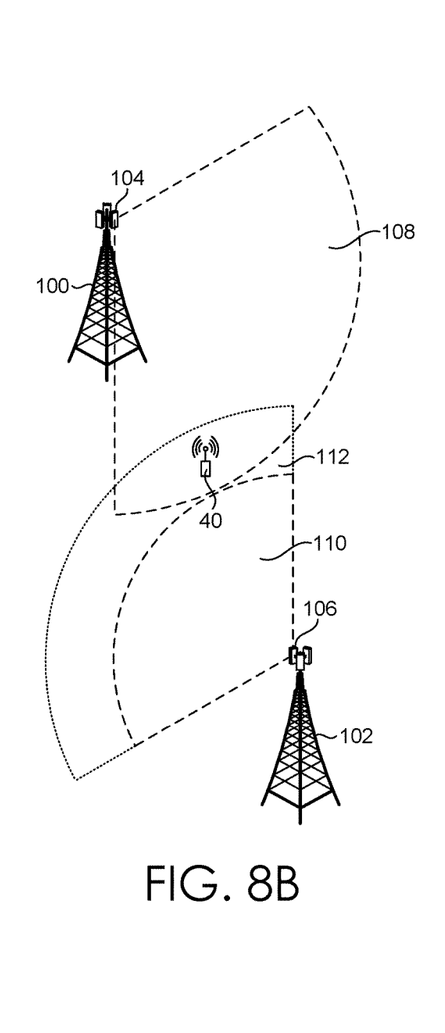

Referring to FIGS. 8A-8B, an exemplary adjustment of a signal from a broadcast cell to mitigate signal conflict is provided, in accordance with an embodiment of the present technology. As shown in FIGS. 8A-8B, first and second broadcast cells 100, 102 operating within a wireless communication network are provided. The first broadcast cell 100 includes a first transmitting and receiving component 104 broadcasting to a first sector of coverage 108, and the second broadcast cell 102 includes a second transmitting and receiving component 106 broadcasting to a second sector of coverage 110. The first and second sectors of coverage 108, 110 are overlapping. When the transmitting and receiving components 104, 106 are aligned along a direct line of sight, are using a common channel/frequency, and are using a common synchronization signal, a signal conflict, such as a PSS or SSS signal conflict, may occur.

Also shown in FIGS. 8A-8B is a mobile communication device 40 located in an overlapping sector of coverage 112 from the first and second broadcast cells 100, 102. Due to the signal conflict, the mobile communication device 40 may require more time than desired to attach to one of the first and second broadcast cells 100, 102, and/or may fail in attempting to attach to the first and second broadcast cells 100, 102. As a result, as shown in FIG. 8B, a power of the signal emitted by the second broadcast cell 102 may be reduced, reducing the footprint of the second sector of coverage 110, and thereby reducing the signal interference between the first broadcast cell 100 and the second broadcast cell 102.

Figure 9:
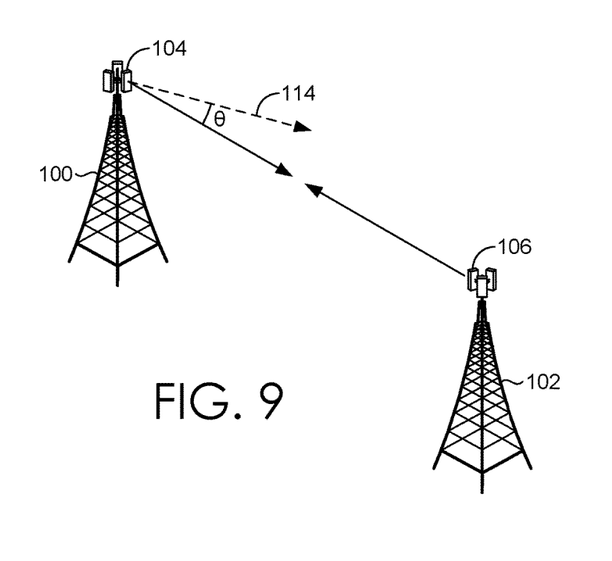
FIG. 9 depicts an exemplary adjustment of an orientation of a signal from a broadcast cell to mitigate signal conflict, in accordance with an embodiment of the present technology.

FIG. 9 further depicts the broadcast cells 100, 102 of FIGS. 8A-8B with an orientation of the transmitting and receiving component 104 of the first broadcast cell 100 adjusted to reduce alignment of signals between the first and second broadcast cells 100, 102, thereby reducing a signal conflict between the first and second broadcast cells 100, 102. A theta adjustment of 1, 2, 3, 4, or 5 degrees from a line of sight between the first and second transmitting and receiving components 104, 106 may be used, for example, to mitigate synchronization signal conflict. The movement may be provided by a movement mechanism, as discussed with respect to FIG. 5.

Figure 10:
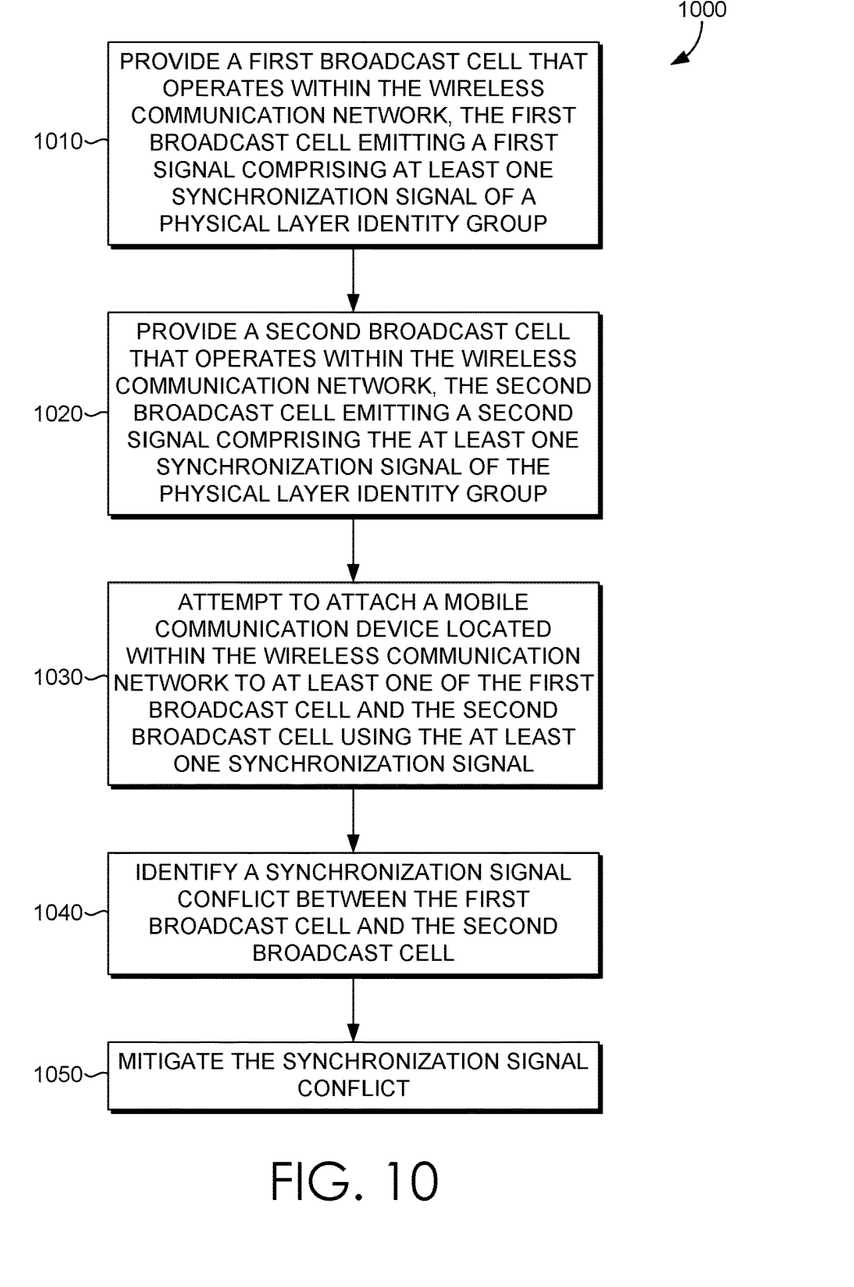
FIG. 10 is a block diagram of a first exemplary method of identifying and mitigating signal conflict in a wireless communication network, in accordance with an embodiment of the present technology.

Referring to FIG. 10, a block diagram of an exemplary method 1000 for mitigating synchronization signal conflict in a wireless communication network is provided, in accordance with an embodiment of the present technology. At a block 1010, a first broadcast cell, such as the first broadcast cell 52 shown in FIG. 4, is provided that operates within a wireless communication network, such as the network 30 shown in FIG. 2, the first broadcast cell emitting a first signal, such as the first signal 58 shown in FIG. 4, comprising at least one synchronization signal of a physical layer identity group. At a block 1020, a second broadcast cell, such as the second broadcast cell 54 shown in FIG. 4, is provided that operates within the wireless communication network, the second broadcast cell emitting a second signal, such as the second signal 60 shown in FIG. 4, comprising the at least one synchronization signal of the physical layer identity group. At a block 1030, a mobile communication device, such as the mobile communication device 40 shown in FIG. 4, located within the wireless communication network attempts to attach to at least one of the first broadcast cell and the second broadcast cell using the at least one synchronization signal. At a block 1040, a synchronization signal conflict is identified between the first broadcast cell and the second broadcast cell. At a block 1050, the synchronization signal conflict is mitigated.

Figure 11:
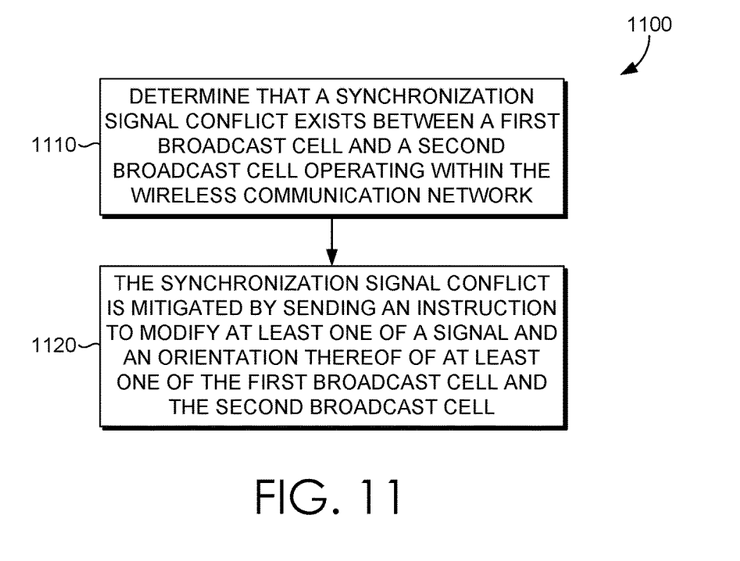
FIG. 11 is a block diagram of a second exemplary method of identifying and mitigating signal conflict in a wireless communication network, in accordance with an embodiment of the present technology.

Referring to FIG. 11, a block diagram of an exemplary method 1100 for mitigating synchronization signal conflict in a wireless communication network is provided, in accordance with an embodiment of the present technology. At a block 1110, a synchronization signal conflict between a first broadcast cell, such as the first broadcast cell 52 shown in FIG. 4, and a second broadcast cell, such as the second broadcast cell 54 shown in FIG. 4, operating within the wireless communication network is determined. The first broadcast cell emits a first signal, such as the first signal 58 shown in FIG. 4, from a first transmitting and receiving component, such as the first transmitting and receiving component 57 shown in FIG. 4, that is in communication with a mobile communication device, such as the mobile communication device 40 shown in FIG. 4, and the second broadcast cell emits a second signal, such as the second signal 60 shown in FIG. 4, from a second transmitting and receiving component, such as the second transmitting and receiving component 59 shown in FIG. 4, that is in communication with the mobile communication device. At a block 1020, the synchronization signal conflict is mitigated by sending an instruction to modify at least one of a signal and an orientation thereof of at least one of the first broadcast cell and the second broadcast cell.

Although aspects of the present technology, including identification and mitigation of signal conflict, are discussed in relation to synchronization signal conflict between broadcast cells in LTE networks, other types of signal conflict detection and mitigation in the same or other networks may be provided as well. For example, in Code Division Multiple Access (CDMA), pilot pollution signal interference may be detected and mitigated similarly. Furthermore, as discussed herein, network performance and broadcast cell/mobile device feedback to a central server may be used to identify when signal interference is occurring between broadcast cells. Additionally, modifications to components that affect signal orientation locally at broadcast cells and modifications to emitted signals from broadcast cells may be controlled remotely by the central server, or locally at the broadcast cell after communication of instructions from the central server to the broadcast cell. In this respect, a central server may instruct, control, log, and track network information related to signal interference, and mitigate signal interference at the broadcast cells. In some aspects, a broadcast cell may include components that can detect signals from other broadcast cells, including characteristics of the signals (PCI, PSS, SSS, frequency channel, signal strength, interference factors, etc.), and communicate the same to the central server for signal conflict detection, mitigation, and tracking, and/or use such information to control adjustments to the components and signals emitted from the broadcast cell to mitigate signal conflict.

The present technology has been described in relation to particular embodiments, which are intended in all respects to be illustrative rather than restrictive. Alternative embodiments will become apparent to those of ordinary skill in the art to which the present technology pertains without departing from its scope. Different combinations of elements, as well as use of elements not shown, are possible and contemplated.

What is claimed is:

1. A method for mitigating signal conflict in a wireless communication network, the method comprising:

emitting a first signal comprising at least one synchronization signal of a physical layer identity group from a first broadcast cell operating within the wireless communication network, the first signal emitted from a first transmitting and receiving component that is coupled to a first movement mechanism attached to the first broadcast cell;

emitting a second signal comprising the at least one synchronization signal of the physical layer identity group from a second broadcast cell operating within the wireless communication network, the second signal emitted from a second transmitting and receiving component that is coupled to a second movement mechanism attached to the second broadcast cell;

identifying a synchronization signal conflict between the first broadcast cell and the second broadcast cell; and mitigating the synchronization signal conflict by sending an instruction to at least one of the first movement mechanism and the second movement mechanism to modify an orientation of the first transmitting and receiving component and the second transmitting and receiving component relative to each other.

2. The method of claim 1, wherein the synchronization signal conflict is identified based on an amount of time required for a mobile communication device to attach to the first broadcast cell or to the second broadcast cell.

3. The method of claim 1, wherein the synchronization signal conflict is identified based on a determination that the first signal from the first broadcast cell and the second signal from the second broadcast cell are transmitting towards each other along a line of sight between the first broadcast cell and the second broadcast cell with overlapping sectors of coverage.

4. The method of claim 1, wherein mitigating the synchronization signal conflict comprises performing at least one of:

modifying a power of at least one of the first signal and the second signal to adjust a coverage area thereof; and modifying a frequency of at least one of the first signal and the second signal.

5. The method of claim 1, further comprising attempting to attach a mobile communication device to at least one of the first broadcast cell and the second broadcast cell prior to identifying the synchronization signal conflict.

6. The method of claim 1, wherein mitigating the synchronization signal conflict further comprises adjusting a radiation center of at least one of the first broadcast cell and the second broadcast cell.

7. The method of claim 1, further comprising, upon identifying the synchronization signal conflict, sending a notification of the synchronization signal conflict to at least one of the first broadcast cell and the second broadcast cell.

8. The method of claim 1, wherein the synchronization signal conflict is identified locally by at least one of the first broadcast cell and the second broadcast cell.

9. The method of claim 1, wherein the synchronization signal conflict is identified remotely from the first broadcast cell and the second broadcast cell by a computing device in communication with the first broadcast cell and the second broadcast cell, and wherein the computing device includes a signal attachment time log that maintains a log of attachment times for mobile communication devices operating within the wireless communication network.

10. The method of claim 1, wherein the at least one synchronization signal comprises a primary synchronization signal and a secondary synchronization signal, the synchronization signal conflict being identified based on the primary synchronization signal.

11. A computer-implemented method of mitigating signal conflict in a wireless communication network, the method comprising:
 identifying a synchronization signal conflict between a first broadcast cell and a second broadcast cell that are operating within the wireless communication network,
  the first broadcast cell emitting a first signal from a first transmitting and receiving component coupled to a first movement mechanism that is attached to the first broadcast cell, and
  the second broadcast cell emitting a second signal from a second transmitting and receiving component coupled to a second movement mechanism that is attached to the second broadcast cell; and
 mitigating the synchronization signal conflict by sending an instruction to adjust at least one of the first movement mechanism and the second movement mechanism to modify an orientation of the first and second transmitting and receiving components relative to each other.

12. The computer-implemented method of claim 11, wherein mitigating the synchronization signal conflict further comprises sending an instruction to modify at least one of a channel, a frequency, and a power of at least one of the first signal and the second signal.

13. The computer-implemented method of claim 12, wherein the instruction comprises an instruction to modify at least one of a horizontal and a vertical orientation of the at least one of the first and second signal transmitting and receiving components.

14. The computer-implemented method of claim 11, wherein the synchronization signal conflict is identified based on at least one of:
 a time required for a mobile communication device to attach to the first broadcast cell or the second broadcast cell; and
 a failure of a mobile communication device to attach to the first broadcast cell or the second broadcast cell.

15. The computer-implemented method of claim 11, wherein the synchronization signal conflict is identified based on:
 a line of sight between the first and second transmitting and receiving components;
 the first and second signals transmitting over a common channel; and
 the first and second signals using a common primary synchronization signal.

16. A system for mitigating signal conflict in a wireless communication network, the system comprising:
 a first broadcast cell configured to emit a first signal using a first transmitting and receiving component that is coupled to a first movement mechanism attached to the first broadcast cell, the first signal comprising at least one synchronization signal of a physical layer identity group;
 a second broadcast cell configured to emit a second signal using a second transmitting and receiving component that is coupled to a second movement mechanism attached to the second broadcast cell, the second signal comprising the at least one synchronization signal of the physical layer identity group; and
 one or more computer-readable media having computer-executable instructions stored thereon which, when executed by one or more computer processors, perform a method for mitigating single conflict in the wireless communication network, the method comprising:
  identifying a synchronization signal conflict between the first broadcast cell and the second broadcast cell; and
  mitigating the synchronization signal conflict by sending an instruction to adjust at least one of the first movement mechanism and the second movement mechanism to modify an orientation of the first and second transmitting and receiving components relative to each other.

17. The system of claim 16, wherein the synchronization signal conflict is identified based on:
 an amount of time required for a mobile communication device to attach to the first broadcast cell or the second broadcast cell, and
 the first and second broadcast cells having overlapping sectors of coverage.

18. The system of claim 16, wherein mitigating the synchronization signal conflict further comprises modifying at least one of the first and second signals by adjusting at least one of a channel, a frequency, and a power thereof.

19. The system of claim 16, wherein the first and second movement mechanisms each comprise a respective gimbal mechanism.

20. The system of claim 16, wherein the one or more computer-readable media and the one or more computer processors are located at a central server in communication with the first and second broadcast cells, wherein the central server is separately located from the first and second broadcast cells.

* * * * *